May 21, 1957  W. HOWELL  2,792,621
CONSUMABLE TITANIUM ELECTRODE
Filed Aug. 19, 1953
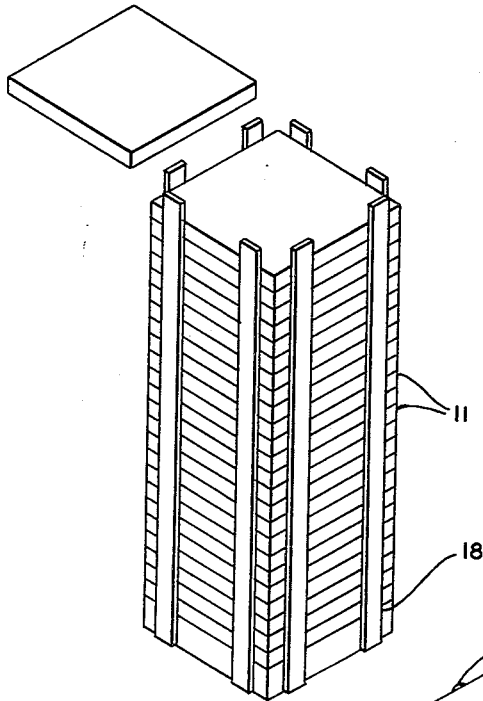
Fig.1
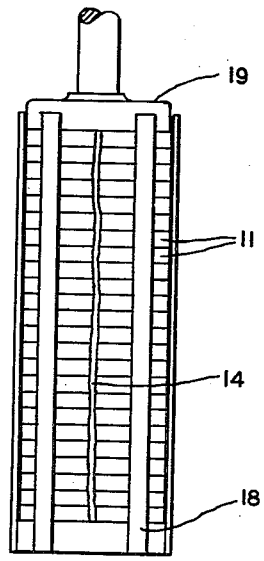
Fig.2
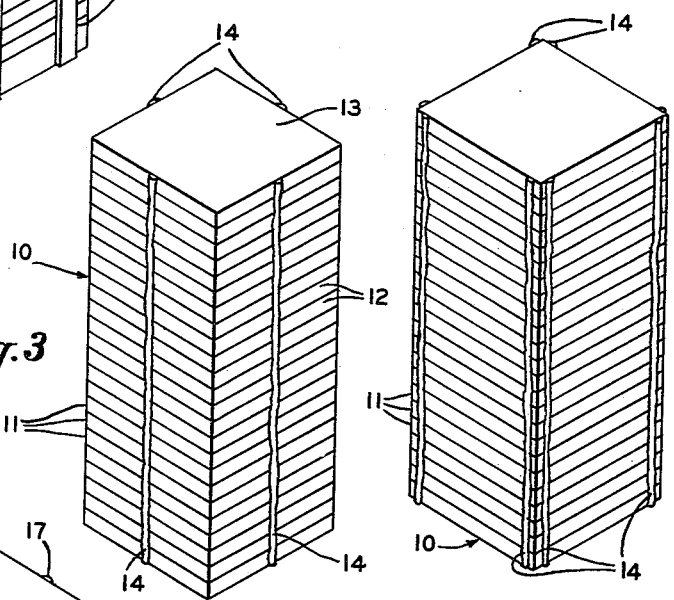
Fig.3
Fig.4
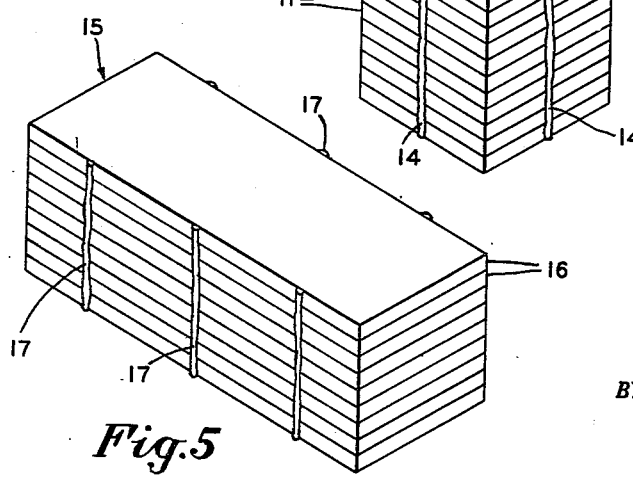
Fig.5
INVENTOR.
William Howell
BY
Frease & Bishop
ATTORNEYS

United States Patent Office 2,792,621
Patented May 21, 1957

2,792,621

CONSUMABLE TITANIUM ELECTRODE

William Howell, Warren, Ohio, assignor to Mallory-Sharon Titanium Corporation, Niles, Ohio, a corporation of Ohio Application August 19, 1953, Serial No. 375,193

1 Claim. (Cl. 29—184)

The invention relates to a consumable titanium electrode, and more particularly and specifically to a consumable electrode made from titanium sheet scrap for use in the production of titanium ingots.

In the manufacture of titanium ingots, bars, forgings, sheets and the like, a considerable amount of titanium scrap material results. Such titanium scrap has a very substantial value, and it is important from an economic standpoint to use such titanium scrap to the best possible advantage.

However, the characteristics of titanium are such that it is not possible to use titanium scrap, in its various forms, in the usual manners in which other metal scrap is used.

Scrap titanium in sponge, bar end and chip form is now being used economically, but there has not been any known practical manner of using sheet or plate titanium scrap.

An object of the present invention resides in the provision of a consumable titanium electrode formed from pieces of titanium sheet or plate scrap, which electrode may be used in an arc furnace for the production of titanium ingots.

These and other objects and advantages apparent to those skilled in the art from the following description and claim are accomplished and may be obtained by the parts, constructions, arrangements, combinations, methods, steps, operations and procedures which comprise the present invention, the nature of which is set forth in the following general statement, preferred structural and procedural embodiments of which—illustrative of the best modes in which applicant has contemplated applying the principles—are set forth in the following description, and which are particularly and distinctly pointed out and set forth in the appended claim forming part hereof.

The nature of the present invention and discoveries may be stated in general terms as including the provision of a consumable titanium electrode for the production of titanium ingots by using titanium sheet or plate scrap wherein said electrode includes a plurality of blanks cut from titanium sheet, said blanks being of uniform configuration and arranged and held under pressure in an edge aligned stack with said blanks in face to face contact, and said stack of blanks under pressure being tack welded on at least two sides thereof transversely of the aligned edges of the blanks constituting the stack, whereby said stack of blanks is formed into a unitary consumable electrode; and the provision of a method of making consumable titanium electrodes for producing titanium ingots using titanium sheet or plate scrap which includes the steps of shearing titanium sheet or plate scrap into blanks of uniform configuration, arranging said blanks face to face in an edge aligned stack or bundle, compressing said stack of blanks perpendicularly to the faces of the blanks, and then tack welding the blanks while compressed on at least two sides of the stack transversely of the aligned blank edges to form a consumable titanium electrode.

Referring now to the accompanying drawing which is illustrative of preferred embodiments of the present invention, and in which like numerals designate similar parts throughout the several views;

Figure 1 is a composite, pictorial view of titanium sheet or plate blanks arranged in a stack;

Fig. 2 is a pictorial view illustrating the stacked blanks pressed together and welded into a unitary electrode;

Fig. is a pictorial view of one form of electrode;

Fig. 4 is a pictorial view of a modified form of electrode; and

Fig. 5 is a second form of electrode formed by the improved method.

The new consumable titanium electrode of the present invention may be made in several forms such as illustrated in Figs. 3 through 5.

Referring to Fig. 3, a consumable titanium electrode is generally indicated at 10, including a plurality of blanks 11. The blanks 11 are sheared from titanium sheet or plate scrap with uniform, preferably square, configuration, as shown, and are arranged in a stack with their edges 12 aligned lengthwise of the stack and with their face portions 13 arranged in close metal to metal or surface to surface contact.

The blanks 11 are then joined in their stacked arrangement by welds 14 which extend transversely of the aligned edges of the blanks in the stack on as many sides and at as many points lengthwise of the stack as is necessary to secure the blanks into the unitary resultant titanium electrode 10.

As illustrated in Fig. 3, the stack of blanks 11 is welded at 14 on the transverse center lines of the sides of the rectangular electrode 10.

In the modified form of electrode 10 illustrated in Fig. 4, the longitudinal welds 14 joining the blanks 11 into the unitary electrode are formed adjacent each corner of the rectangular electrode.

The forms of electrodes 10 illustrated in Figs. 3 and 4 are merely illustrative of the possible manner in which the individual blanks forming each electrode may be joined together. The blank thicknesses may vary depending on the gauge of sheet or plate scrap used.

In the forms of electrodes shown in Figs. 3 and 4, it is contemplated generally that the blanks 11 may be sheared into squares such as 2¼" squares regardless of the sheet thickness, and stacked to desired depth to produce a resultant electrode 2¼" square of suitable length for use as a consumable electrode in an arc furnace.

However, the size stated is merely an example indicating the ready adaptability of the present invention for the purposes intended; and such dimensions and configurations are not to be considered in any way as a limitation on the new and improved electrode construction herein disclosed and claimed, since a consumable electrode of circular or polygonal shape, and of any dimension constructed in the manner herein illustrated and described would fall within the contemplated modifications.

Another form of consumable electrode is generally indicated at 15 in Fig. 5 and may have an overall shape and configuration substantially identical with the electrode 10 illustrated in Figs. 3 and 4. However, the electrode 15 includes a plurality of blanks 16 cut from titanium sheet or plate scrap with lengths substantially equal to the length of the desired electrode. The blanks 16 are arranged to extend lengthwise of the resultant electrode and are joined face to face laterally of the electrode 15 by tack welds 17.

As in the previous forms, the electrode 15 is joined by welds 17 extending transversely of the edges of the blanks constituting the electrode at as many points and in as many locations as is necessary to form a compact unitary electrode.

The new method of the present invention relates to the manufacture of consumable titanium electrodes for use in the manufacture of titanium ingots using titanium sheet or plate scrap, which scrap heretofore has been practically impossible to salvage and has involved substantial loss.

The method is diagrammatically illustrated in Figs. 1 and 2 and includes the initial forming of titanium sheet blanks 11 from scrap sheet titanium to uniform configuration. The blanks 11 then are arranged in a suitable jig or form 18 to align the blanks in a face to face edge aligned stack. A ram 19 may then hold the stacked blanks 11 under pressure to compress the blanks into close metal to metal surface to surface contact. While the blanks 11 are maintained under the pressure of the ram 19 they are then tack welded, as at 14, by a shielded heliarc welding tool transversely of the aligned edges at several locations about the stack to join the blanks into a unitary consumable electrode 10.

In the illustration of the method in Figs. 1 and 2 the blanks 11 are shown formed as squares arranged face to face vertically within the jig 18 where they are held under compression while being welded to form the finished consumable titanium electrode 10. However, it is contemplated that other blank shapes such as circles or rectangles may be cut or otherwise formed from titanium sheet or plate scrap for making a laminated consumable titanium electrode.

In making the electrode 15 shown in Fig. 5 rectangular blanks 16 are formed having lengths equal to the length of the electrode to be made, and having widths equal to one lateral dimension of the electrode. The blanks 16 are then arranged in a bundle in close metal to metal surface to surface contact, and the bundle is compressed and welded, as at 17, transversely of the edges of the blanks to form the electrode 15.

The welds 14 and 17 joining the blanks into unitary electrodes have been described as tack welds extending directly between adjacent blanks 11 or 16. However, in the alternative the blanks may be joined together by means of welding a titanium sheet or strip strap to the blanks at locations such as the locations of the welds 14 or 17.

Accordingly, the invention provides a consumable electrode construction and method of making the same which permits the salvaging of titanium sheet or plate scrap for the manufacture of titanium ingots, whereby such titanium scrap may be substantially completely utilized.

Furthermore, the improved constructions and method enable the production of a consumable titanium electrode formed of a plurality of blanks of sheet material which by reason of its compressed construction has sufficient electrical conductivity to permit it to be used as a consumable electrode in an arc furnace for the production of titanium ingots.

In the foregoing description, certain terms have been for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction illustrated or described.

Having now described the invention, the constructions, manufacture and use of preferred embodiments thereof, and the advantageous new and useful results obtained thereby, the new and useful methods and constructions, and reasonable mechanical equivalents thereof obvious to those skilled in the art, are set forth in the appended claim.

I claim:

A laminated consumable titanium electrode formed from titanium non-apertured sheet scrap material including a compressed stack of titanium scrap blanks in metal to metal, surface to surface contact and having equal dimensions of width and length, the stacked blanks having aligned edges, and adjacent blanks being secured together solely by tack welds at their edges.

References Cited in the file of this patent

UNITED STATES PATENTS

| | | |
|---|---|---|
| 461,345 | Kraatz | Oct. 13, 1891 |
| 1,204,037 | Laher | Mar. 7, 1916 |
| 1,619,346 | Houston et al. | Mar. 1, 1927 |
| 2,448,785 | Dolan | Sept. 7, 1948 |
| 2,477,279 | Anderson | July 26, 1949 |
| 2,576,793 | Jordan | Nov. 27, 1951 |